(12) United States Patent
Reber et al.

(10) Patent No.: US 8,873,233 B2
(45) Date of Patent: Oct. 28, 2014

(54) VEHICLE DOCK FOR RUGGEDIZED TABLET

(75) Inventors: David Reber, Cedar Park, TX (US); Bryan Bell, Georgetown, TX (US)

(73) Assignee: Xplore Technologies Corp., Austin, TX (US)

( * ) Notice: Subject to any disclaimer, the term of this patent is extended or adjusted under 35 U.S.C. 154(b) by 276 days.

(21) Appl. No.: 13/284,506

(22) Filed: Oct. 28, 2011

(65) Prior Publication Data
US 2013/0107445 A1    May 2, 2013

(51) Int. Cl.
*H05K 5/00* (2006.01)
*H05K 7/00* (2006.01)
*G06F 1/16* (2006.01)
*H04M 1/04* (2006.01)

(52) U.S. Cl.
CPC .............. *G06F 1/1632* (2013.01); *H04M 1/04* (2013.01)
USPC ............. 361/679.41; 361/679.01; 361/679.43

(58) Field of Classification Search
USPC ............. 361/679.01, 679.56, 679.31, 679.41, 361/679.42, 679.43, 679.44
See application file for complete search history.

(56) References Cited

U.S. PATENT DOCUMENTS

| | | | |
|---|---|---|---|
| 5,666,530 A | 9/1997 | Clark et al. | |
| 5,864,708 A | 1/1999 | Croft et al. | |
| 6,101,087 A | 8/2000 | Sutton et al. | |
| 6,282,082 B1 | 8/2001 | Armitage et al. | |
| 6,426,872 B1 | 7/2002 | Sutton et al. | |
| 6,504,710 B2 * | 1/2003 | Sutton et al. ............. | 361/679.41 |
| 6,532,152 B1 | 3/2003 | White et al. | |
| 6,594,146 B2 | 7/2003 | Frangesch et al. | |
| 6,856,506 B2 | 2/2005 | Doherty et al. | |
| 6,937,468 B2 | 8/2005 | Lin et al. | |
| 6,982,702 B1 | 1/2006 | Frame | |
| 7,035,100 B2 | 4/2006 | Lord | |
| 7,231,481 B2 | 6/2007 | Scott et al. | |
| 7,236,863 B2 * | 6/2007 | LaPorte et al. .................. | 701/36 |

(Continued)

FOREIGN PATENT DOCUMENTS

WO    02/095555 A2    11/2002

OTHER PUBLICATIONS

Wireless Power Consortium, "Wireless Electricity Transmission", How Wireless Electricity Transmission Works, Apr. 20, 2010, obtained from url: <http://www.wirelesspowerconsortium.com/technology/how-it-works.html>.

(Continued)

*Primary Examiner* — Anthony Haughton
(74) *Attorney, Agent, or Firm* — Pillsbury Winthrop Shaw Pittman LLP (57) ABSTRACT

A system and apparatus for robustly transferring power and data between a portable computing device, such as a ruggedized tablet, and a docking station is provided. The tablet and the docking station may each have a docking connector and a wireless communication device. In some embodiments, the docking station may transfer power to the tablet through electrical contacts of the docking connectors and may communicate data through the wireless communication devices. The docking station's docking connector may mount electrical contacts for transferring power and may mount few or no electrical contacts for transferring data. The tablet's docking connector may retain electrical contacts for transferring power and electrical contacts for transferring data. In some embodiments, all the electrical contacts for transferring data may be unused.

5 Claims, 13 Drawing Sheets

(56) References Cited

U.S. PATENT DOCUMENTS

| | | | |
|---|---|---|---|
| 7,298,611 B1 | 11/2007 | Carnevali | |
| 7,417,855 B2 | 8/2008 | Carnevali | |
| 7,484,963 B2 | 2/2009 | Fenwick et al. | |
| 7,502,225 B2 | 3/2009 | Solomon et al. | |
| 7,562,052 B2 | 7/2009 | Dezonno | |
| 7,583,495 B2 | 9/2009 | Carnevali | |
| 7,679,902 B2 | 3/2010 | Thompson | |
| 7,684,185 B2 | 3/2010 | Farrugia | |
| 7,742,289 B2* | 6/2010 | Quijano et al. | 361/679.21 |
| 7,746,629 B2 | 6/2010 | Assouad et al. | |
| 7,773,037 B2 | 8/2010 | Takasu | |
| 7,859,836 B2 | 12/2010 | Bae | |
| 7,890,688 B2 | 2/2011 | Lichtenegger | |
| 2007/0120752 A1 | 5/2007 | Takasu | |
| 2008/0028118 A1 | 1/2008 | Sayers et al. | |
| 2010/0081473 A1 | 4/2010 | Chatterjee et al. | |
| 2010/0177476 A1* | 7/2010 | Hotelling et al. | 361/679.41 |
| 2010/0195279 A1* | 8/2010 | Michael | 361/679.41 |
| 2010/0250789 A1 | 9/2010 | Collopy et al. | |
| 2010/0250818 A1 | 9/2010 | Gill et al. | |
| 2011/0103003 A1 | 5/2011 | Ward et al. | |

OTHER PUBLICATIONS

Anonymous: "xDock Mobile Dockign System", SC-SCAN—IXPLORE, From Internet: URL: http://www.sc-scan.hu./IXPLORE_Dokkolo.pdf, (Jan. 18, 2010).

International Search Report & Written Opinion dated Sep. 30, 2013 of PCT/US2012/061540 filed Oct. 24, 2012 (15 pages).

International Preliminary Report on Patentability Search Report/Written Opinion dated May 8, 2014 of PCT/US2012/061540 filed Oct. 24, 2012 (10 pages).

Anonymous, "xDock Mobile Docking System", SC-SCan—IXPLORE, Retrieved from the Internet: URL:http://www.sc-scan.hu/IXPLORE_Dokkolo.pdf (retrieved: Jan. 9, 2013).

* cited by examiner

VEHICLE DOCK FOR RUGGEDIZED TABLET

BACKGROUND OF THE INVENTION

1. Field of the Invention

One or more embodiments of the present invention relate generally to portable computers, and relate more particularly to docking stations that may be docked with the portable computers.

2. Description of Related Art

Portable computers such as ruggedized and non-ruggedized tablet PCs, laptops, personal digital assistants (PDAs), and mobile phones are used in a wide variety of environments. Ruggedized tablet PCs and laptops include sealed compartments to house the computer's components so as to discourage foreign debris/moisture from entering the compartments and damaging the computer. Ruggedized tablets may also include various features that protect the computer from damage caused by rough handling, drops, and other impacts. Xplore Technologies Corporation's iX104C4 tablet PC is an example of such a ruggedized computer.

Some ruggedized tablets, as well as other portable computers, have relied on docking stations to provide an interface to peripheral devices, a power source for battery charging and computer operation, a storage device to back up data, and to enhance the overall ease of use of the ruggedized tablet. Some docking stations have been mounted in vehicles, carts, and other mobile equipment so that they may accompany or be otherwise accessible to the ruggedized tablets at a variety of locations. Such vehicular docking stations may need to be designed to provide a robust connection with their tablets even while exposed to various environmental conditions at the locations.

SUMMARY OF EMBODIMENTS OF THE INVENTION

One or more embodiments of the present invention provide for more robust power and data transfer between a portable computer, such as a ruggedized tablet, and a docking station. In one embodiment, the docking station may provide robust power and data transfer in an environment, such as in a vehicle, in which the docking station may be exposed to vibrations, shocks, foreign debris, moisture, or other environment conditions.

One or more embodiments provide a docking station that includes a housing forming a cradle assembly adapted to receive the ruggedized tablet (or other portable computer), a first docking connector that is coupled to the cradle assembly and adapted to transfer power to the ruggedized tablet, and wireless radio technology adapted to wirelessly communicate data with the ruggedized tablet. The first docking connector may have one or more power pins on its surface, or may instead have a primary coil housed in the connector and no power pins on its surface. The surface of the first docking connector of the docking station may have a shape configured to cooperate with a shape of a surface of a second docking connector of the ruggedized tablet. The second connector of the ruggedized tablet may further have one or more power electrical contacts and one or more data electrical contacts. In embodiments where the first docking connector has power pins, each of the one or more power pins on the surface of the first docking connector may be located so as to contact one of the one or more power electrical contacts of the second docking connector when the first docking connector physically engages the second docking connector.

In some embodiments, the first docking connector may include one or more guide pins adapted to fit into a guide recess on the surface of the second docking connector to frictionally couple the first docking connector and the second docking connector when the two docking connectors are physically engaged.

In some embodiments, the one or more power pins and the guide pins may be the only pins mounted on the surface of the first docking connector. In some embodiments, one or more data pins that carry a specific type of data, such as data related to only power transfer, may be mounted on the surface of the first docking connector. In such embodiments, each of the one or more data pins may be connected to a power transfer controller, which may be adapted to control a data transfer rate for communicating data with the portable computing device.

In some embodiments, the docking connector of the docking station may include a seal that encloses a perimeter of the docking connector and that may be adapted to create a watertight seal between the first and second docking connectors when they are physically engaged.

In some embodiments, the one or more conductive pins (e.g., power pins or data pins) of the docking station's docking connector may comprise one or more spring-loaded pins.

In some embodiments, the first docking connector may be detachably coupled to the docking station's housing.

In some embodiments, the housing of the docking station may form a watertight compartment. The wireless communication device may be housed in the watertight compartment.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural forms unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

FIGS. 1-7 illustrate a docking system for a portable computer according to one or more embodiments of the invention.

Figure 1:
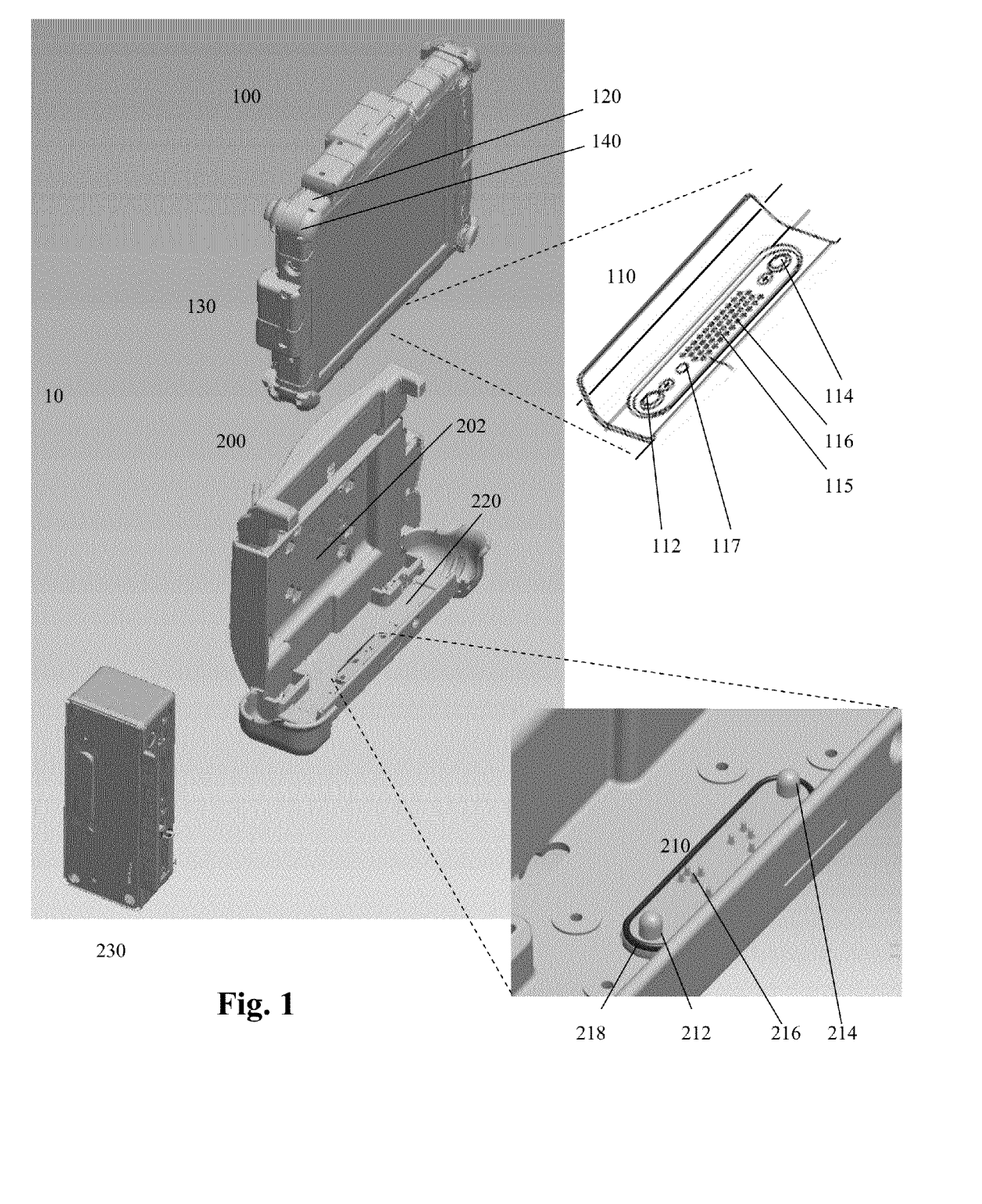
FIG. 1 illustrates a perspective view of an example docking station adapted to interface with a ruggedized tablet.
Figure 1B:
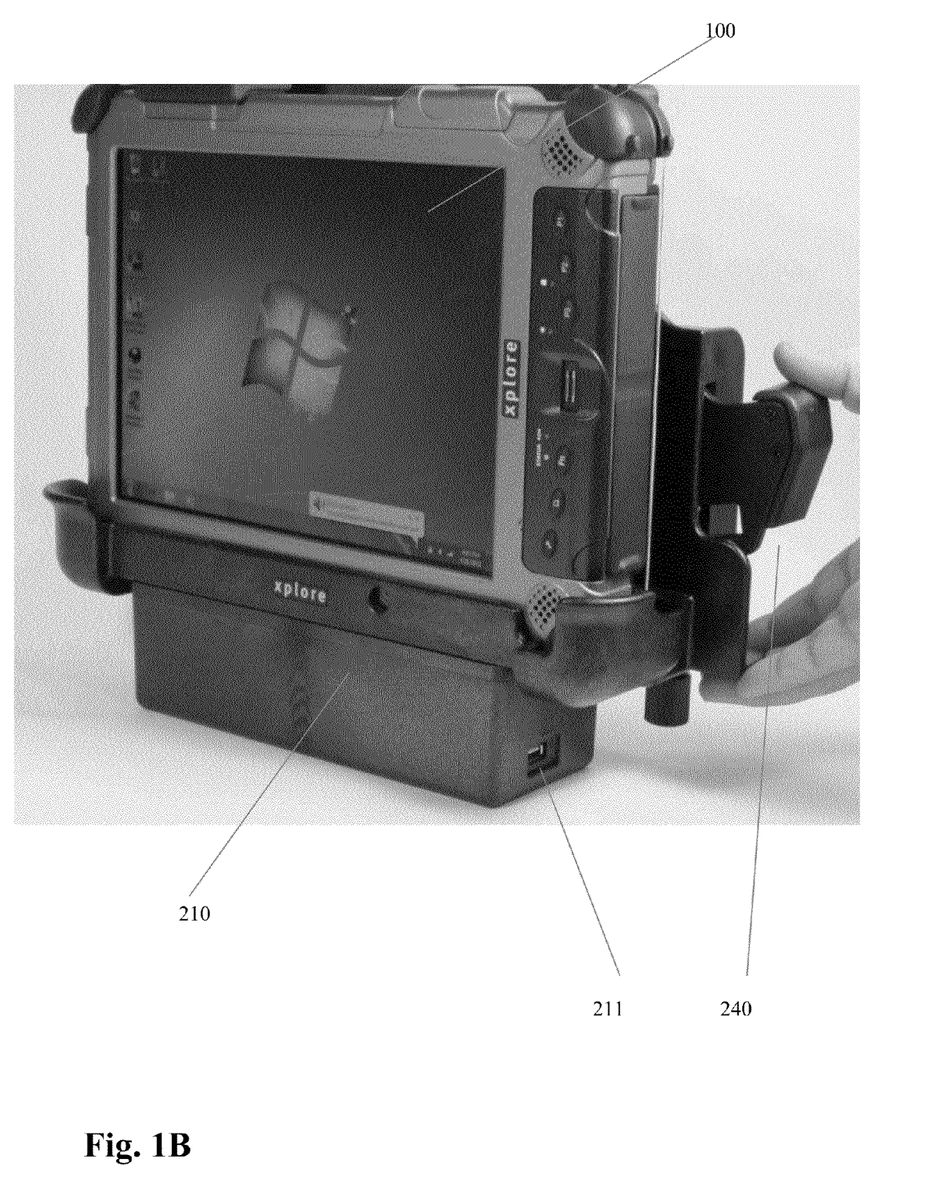
FIG. 1B illustrates a perspective view of an example docking station adapted to interface with a ruggedized tablet.

FIG. 1 illustrates a portable computer docking system 10 that may include a docking station 200 adapted to interface with a portable computer such as a ruggedized tablet 100 according to an embodiment of the invention. Ruggedized tablet 100 may include a housing that forms a case 120 that houses most or all tablet PC components, may include a mounting bracket 140 that may partially or completely enclose case 120, may include a wireless communication device 130 supported by case 120, and may include a docking connector 110 supported by case 120. Docking station 200 of system 10 may include a housing that forms a cradle assembly 220 and a support wall 202, may include a wireless communication device 230 supported by the docking station housing, and a docking connector 210 supported by the housing. The docking station housing may form a watertight sub-housing that houses one or more electronic components, such as wireless communication device 230, and/or other environment-sensitive components. Docking station 200 may further have one or more peripheral interface connectors 211, as shown in FIG. 1B. In some embodiments, docking station 200 may comprise a latching mechanism that secures a docked tablet to the docking station. The secured tablet 100 may be released through a wing lever release mechanism 240 of the docking station. In some embodiments, tablet 100 may be locked to docking station 200 through a tamper-proof key lock.

In some embodiments, case 120 of ruggedized tablet 100 may form a watertight and/or dustproof housing around electronic components (e.g., motherboard, processors, other circuitry) and other tablet components. Case 120 may interface with external electronic components through interface connectors that project through the case. For example, one or more USB® connectors, Firewire® (IEEE 1394) connectors, audio or microphone jacks, serial (RS-232) connectors, parallel connectors, VGA connectors, LAN connectors, PS/2 connectors, HDMI™ connectors, docking connectors (e.g., docking connector 110), or any other electronic interface connectors may be mounted on or embedded in case 120.

In some embodiments, mounting bracket 140 may enclose case 120 and protect the ruggedized tablet against physical shocks or impacts. Bracket 140 may be made of an elastic material, such as rubber, and form a convex portion at the corners of ruggedized tablet 100 so as to disperse any physical shocks or impacts experienced at the corners of the tablet.

Figure 1C:
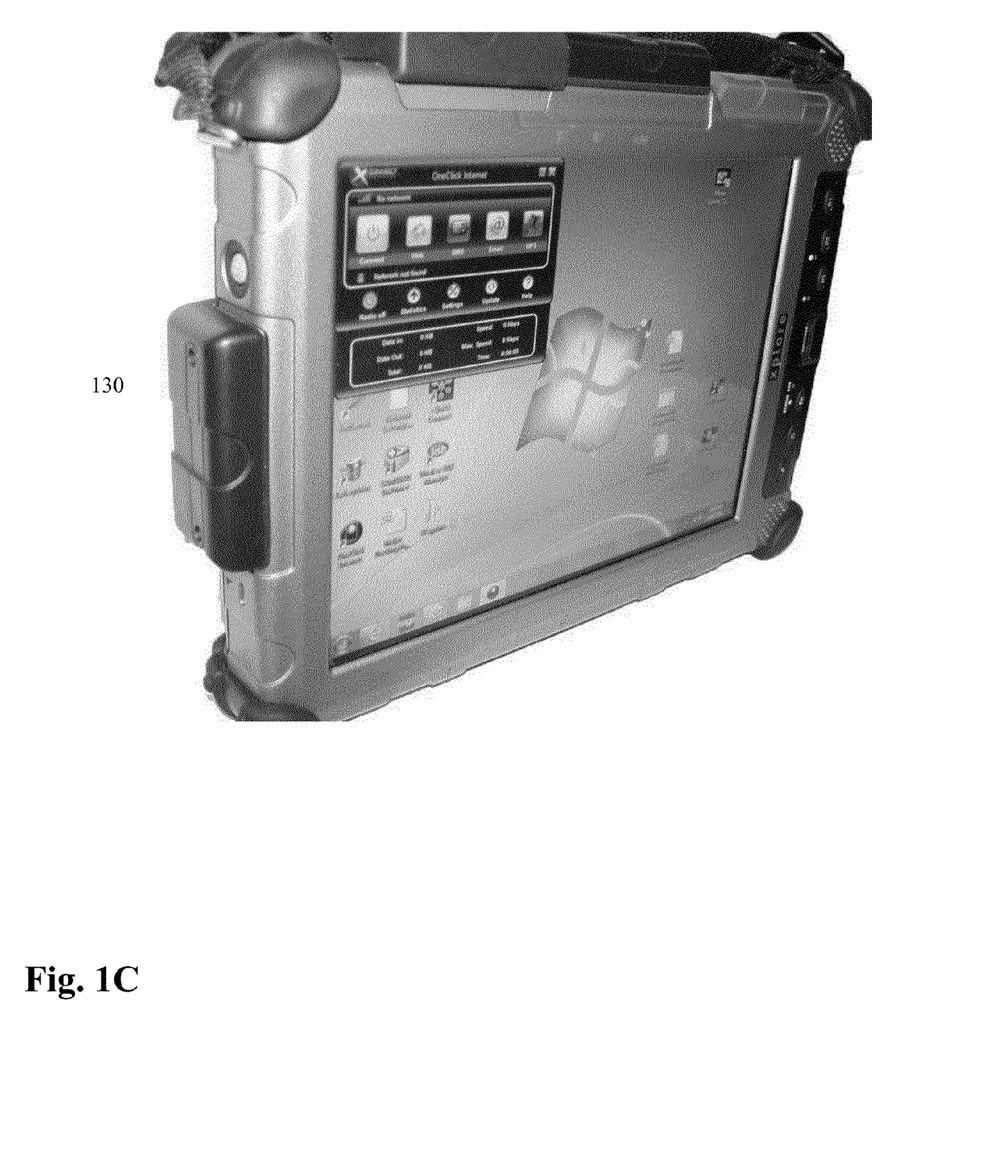
FIG. 1C illustrates a perspective view of an example ruggedized tablet.

In some embodiments, wireless communication device 130 of ruggedized tablet 100 may be external to case 120 and may be supported by case 120 through a detachable connection to one of the electronic interface connectors projecting through the case. In some embodiments, wireless communication device 130 may be permanently attached to case 120 and may be able to communicate directly with tablet 100 through an interface dedicated to wireless communications. An example of an external wireless communication device 130 is shown in FIG. 1C. In some embodiments, wireless communication device 130 may be internal to case 120, and may be an integrated component of tablet 100. For example, device 130 may be an integrated chip on a motherboard of tablet 100. Device 130 may include one or more wireless transceivers and may be configured to receive data wirelessly from docking station 200 or any other wireless transmitter and to relay the data to a processing circuit or bus of tablet 100, and may be configured to transmit data wirelessly from the processing circuit or bus to docking station 200 or to any other wireless receiver. Wireless communication device 130 may be configured to implement one or more wireless communication standards, such as Bluetooth®, IEEE 802.11, Universal Serial Bus (USB), an infrared communication standard, and/or any other wireless communication standard. Data communication as used in this application may include communicating information and communicating commands.

In some embodiments, docking connector 110 of tablet 100 may comprise a plurality of electrical contacts, such as contacts 115, 116, and 117, that are adapted to communicate data or transfer power with docking station 200. Docking connector 110 may further include guide cavities 112 and 114, which may be mated with complementary guide pins on a docking station's connector. The mating of the guide pins and guide cavities may facilitate alignment and engagement, such as through frictional forces, of the two connectors. Docking connector 110 may be partially embedded in case 120 and project through an opening in case 120, or may entirely be mounted on an outside surface of case 120. Case 120 may form a watertight seal between it and the docking connector. The docking connector is discussed in more detail below.

Ruggedized tablet 100 may include additional components, including a display, a battery, and an antenna, which are described in more detail in U.S. Application Ser. No. 13/039,054, entitled "SYSTEM FOR MOUNTING A DISPLAY TO A COMPUTER" and filed on Mar. 2, 2011, the entire content of which is incorporated by reference herein.

Figure 2:
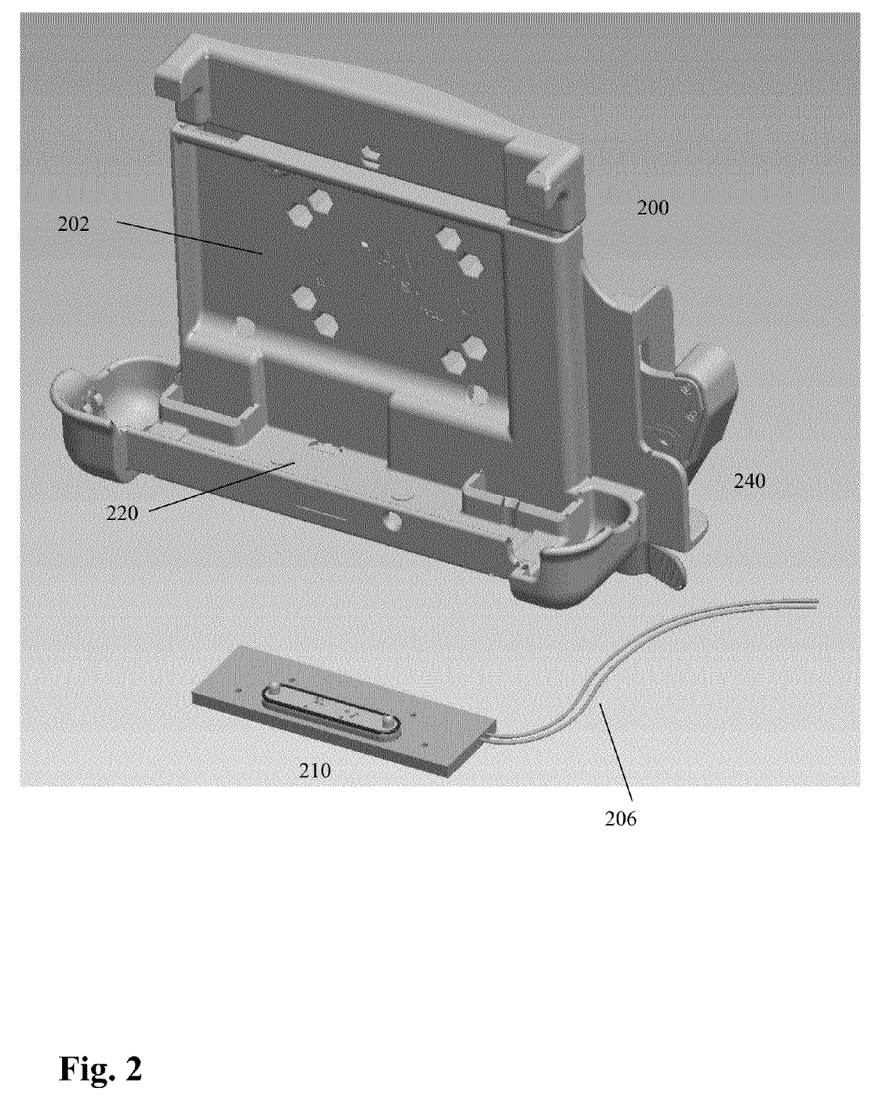
FIG. 2 illustrates a frontal view of the docking station of FIG. 1.
Figure 2B:
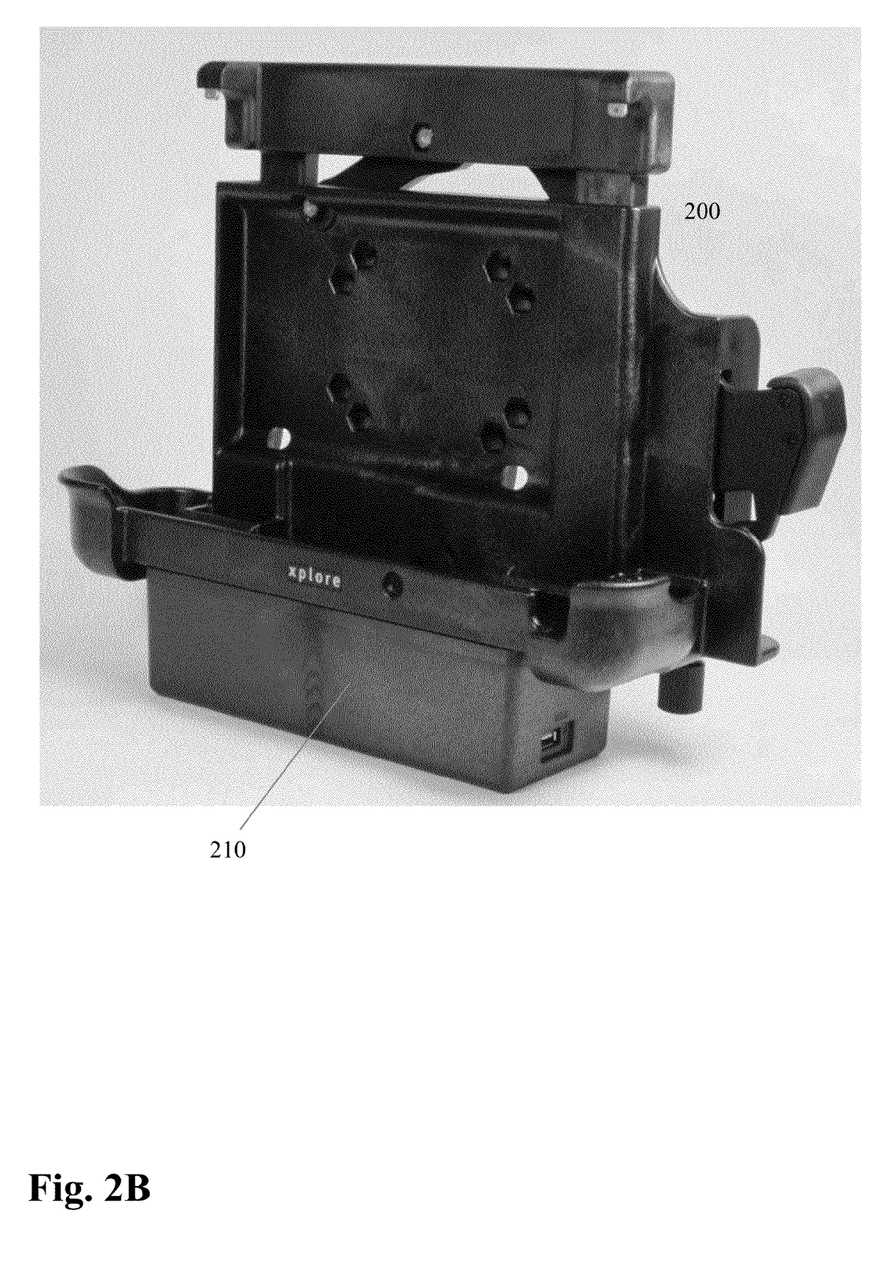
FIG. 2B illustrates a frontal view of the docking station of FIG. 1.

On docking station 200, illustrated in FIG. 2 and FIG. 2B, cradle assembly 220 may form a slot adapted to receive mounting bracket 140 of ruggedized tablet 100. The slot may receive a side of tablet 100 on which its docking connector 110 is located, such as its bottom side. In one example, cradle assembly 220 may have a width that is approximately the same or slightly greater than the width of the bottom side of tablet 100, and may form a concave recess at each end of the slot to receive the convex portions of mounting bracket 140 at the corners of the tablet. Wall 202 of the housing may have dimensions approximate to the front or back side of tablet 100. The wall may support the case and provide a mechanism that secures the tablet to the docking station. For example, the wall may mount a clamping lever, a sliding plate, or any other device adapted to secure tablet 100 to docking station 220.

Figure 2C:
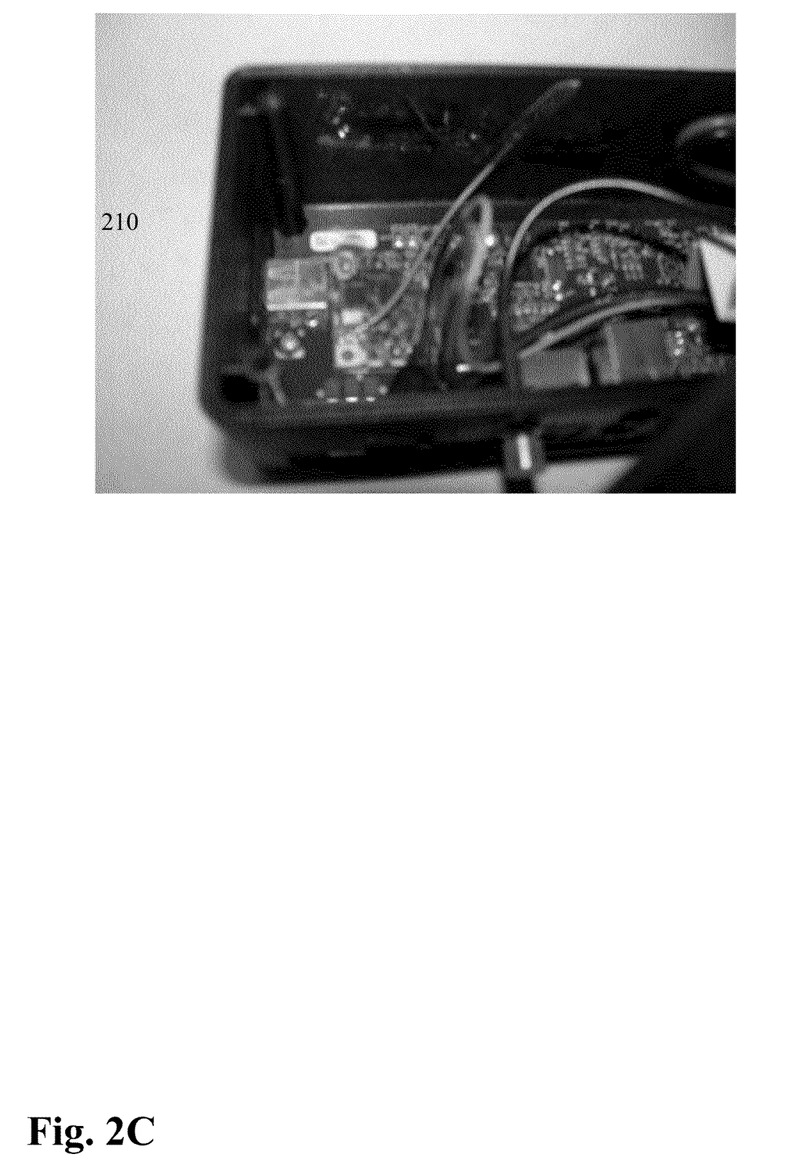
FIG. 2C illustrates a rear view of the docking station of FIG. 1.

Wireless communication device 230 may be contained in a watertight sub-housing, in another location with reduced exposure to moisture, or any other location on the housing. For example, FIG. 2B illustrates a housing of docking connector 210 that may form a watertight sub-housing for electrical components. FIG. 2C illustrates a main board housed in the watertight sub-housing. In some embodiments, wireless communication device 230 may comprise a wireless card (e.g., on a PCB) that is plugged into a main board of the docking station. In some embodiments, wireless communication device 230 may be a USB wireless adapter plugged into a USB interface, such as one located in the watertight sub-housing. Wireless communication device 230 may be configured to wirelessly receive data from and send data to tablet 100 through, for example, wireless communication device 130 or any other wireless transceiver. Wireless communication device 230 may be configured to implement one or more wireless communication standards, such as Bluetooth®, a IEEE 802.11 standard, USB, an infrared communication standard, and/or any other wireless communication standard.

In some embodiments, docking connector 210 of docking station 200 may include one or more power pins, including pin 216, and may include guide pins 212 and 214, and a seal 218. As shown in FIG. 2, docking connector 210 of docking station 200 may project through an opening in cradle assembly 220. In some embodiments, docking connector 210 may be permanently attached to the housing of docking station 200, while in some embodiments it may be detachable from the housing. One or more wires 206 may transfer power and/or data between docking station 200 and a storage device, a wireless transmitter, another tablet, a peripheral device (e.g., a mouse, keyboard, external hard drive, mobile phone, camera), or any other electronic device or power source.

In some embodiments, docking connector 210 may include a primary power coil in a housing of the docking connector. The primary power coil may be adapted to transfer power to the tablet 100 via near field magnetic induction with a secondary coil in docking connector 110. In such embodiments, docking connector 210 may include no power pins on its surface. In such embodiments, docking connector 110 may include no power electrical contacts on its surface.

Figure 2D:
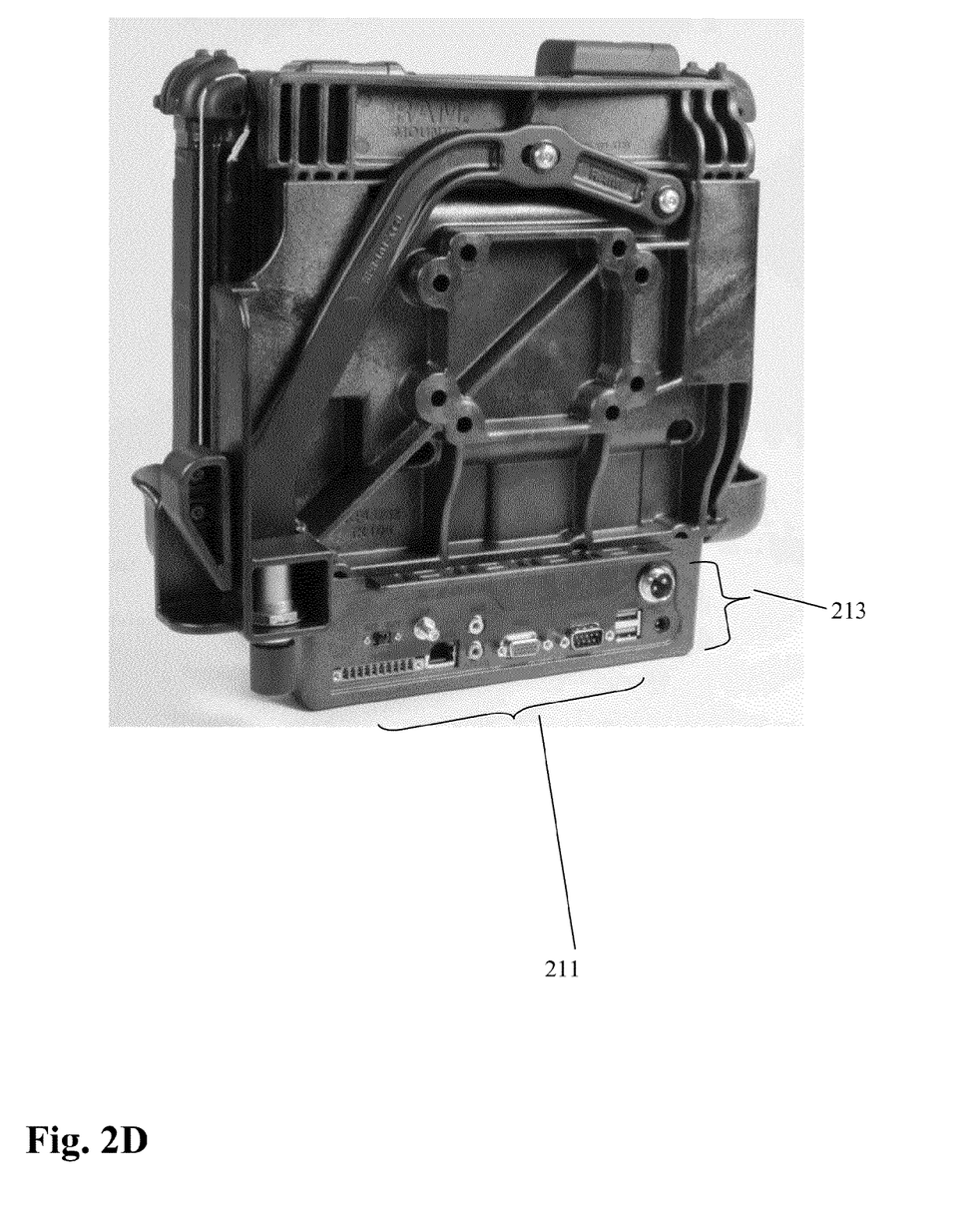
FIG. 2D illustrates a rear view of the docking station's docking connector housing.
Figure 2E:
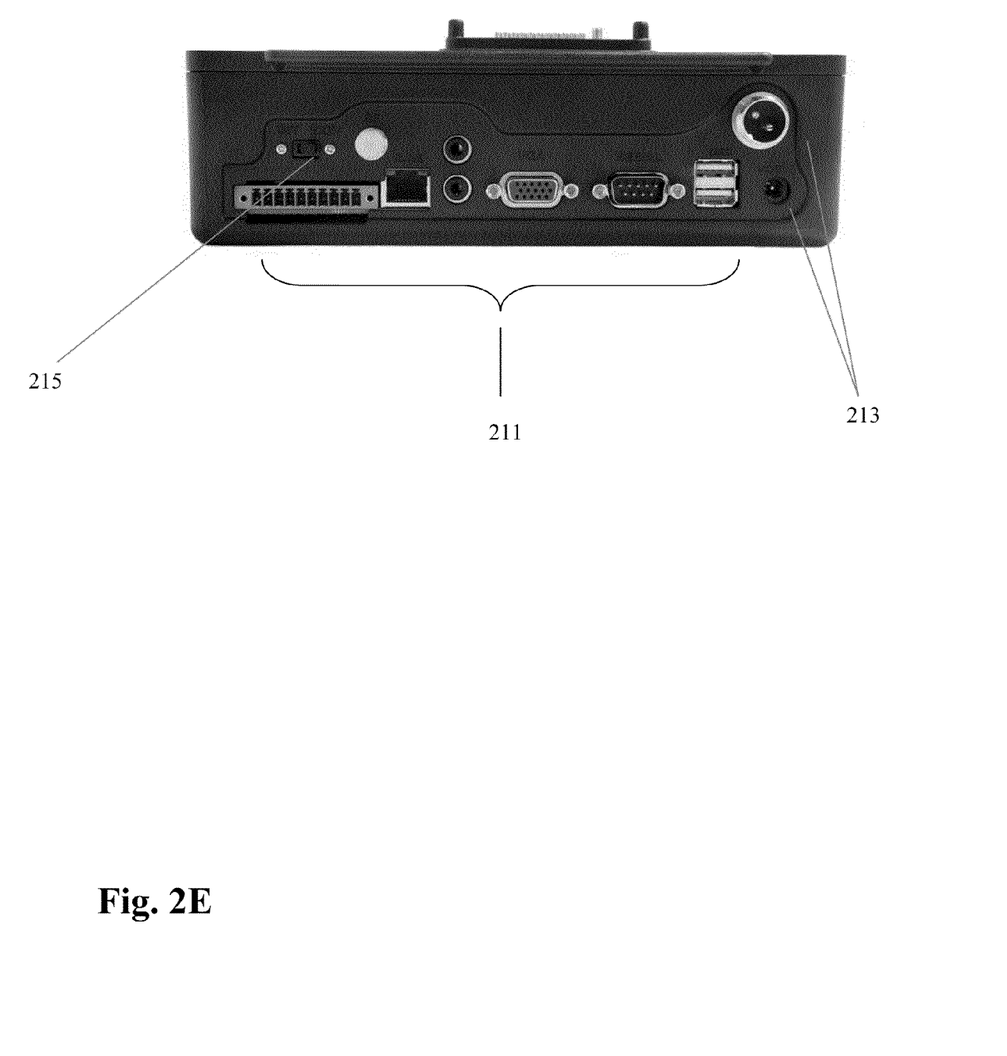
FIG. 2E illustrates a main board housed in the docking station's docking connector housing.

In some embodiments, docking station 200 may include, in addition to the docking connector, one or more other electronic interface connectors. FIGS. 2D and 2E illustrate the back side of docking station 200 to include peripheral interface connectors 211 such as USB® connectors, an audio-in jack, a microphone jack, serial (RS-232) connectors, LAN connector, a VGA connector, a General Purpose I/O (GPIO) connector, and a SMA connector (e.g., for communicating data to and from an antenna). The GPIO connectors may communicate with, for example, external barcode scanners, sensors that monitor vehicle events such as door openings, external displays, or external vehicle-mounted antennas. Some embodiments of docking station 200 may include a parallel connector, a VGA connector, a PS/2 connector, a HDMI™ connector, a switch 215 that selects between an external antenna and a tablet antenna, or any combination thereof. In some embodiments, the USB connector may be a high-retention connector that prevents a USB cable from accidentally slipping off the connector. In some embodiments, the one or more other electronic interface connectors may be adapted to communicate directly with wireless communication device 230. In some embodiments, the one or more other electronic interface connectors may be adapted to communicate with docking connector 210, which may relay data between wireless communication device 230 and the one or more other electronic interface connectors. FIGS. 2D and 2E also shows power connectors 213, which may include a barrel connector. One of the power connectors 213 may further be a screw-on connector. The one or more other electronic interface and power connectors may be mounted on a housing of docking connector 210, as shown in FIG. 2E, or on any other location on the housing of docking station 200.

In some embodiments, docking station 200 may be formed from a lightweight material. For example, the docking station's body may be made from a glass-filled polymer. Some embodiments of docking station 200 may include a high tension piston to exert pressure on the docking station housing and the tablet so as to secure the tablet to the docking station.

Figure 3:
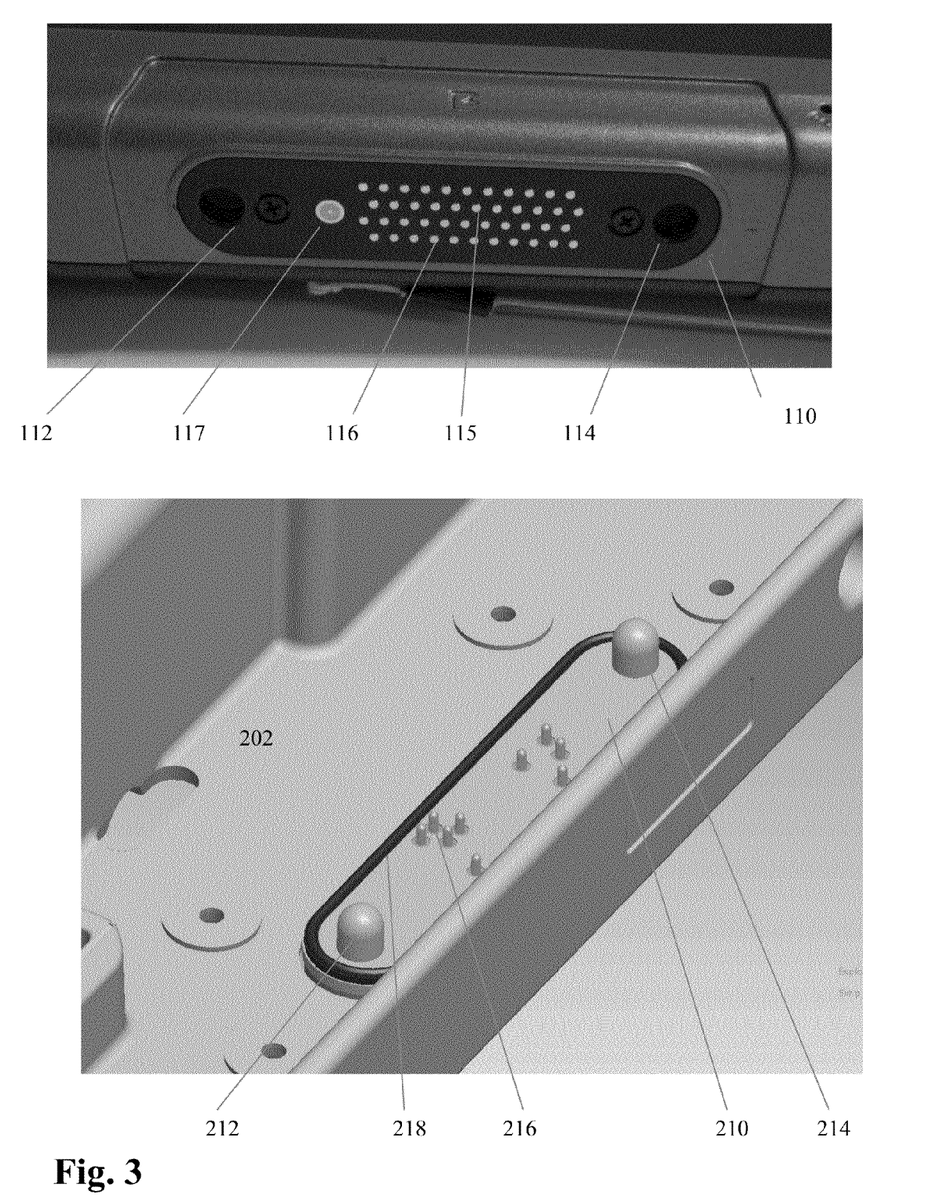
FIG. 3 illustrates an example docking connector of a docking station that is adapted to interface with a docking connector of a ruggedized tablet.

FIG. 3 presents an enlarged view of docking connector 110 of tablet 100 and docking connector 210 of docking station 200. In some embodiments, docking connector 110 of the tablet may comprise electrical contacts for communicating data or for transferring power. The number of electrical contacts, their location, and their function may be determined by a predefined pin layout. For example, electrical contacts 115 and 117 may be defined as data contacts and may connect to a data bus or buffer of tablet 100, while electrical contact 116 may be defined as a power contact in the pin layout and may connect to a power rail or node of tablet 100. The electrical contacts may be adapted to electrically connect to corresponding electrical contacts of a cooperating docking connector, whose contacts may also be arranged and defined according to the pin layout. Electrical contacts 115 and 116 may each form a metal surface area that is adapted to electrically connect to their corresponding data contact or power contact, respectively, on the cooperating connector. Electrical contact 117 may form two electrically isolated metal areas that are adapted to electrically connect to a corresponding co-axial pin on the cooperating connector. In some embodiments, electrical contacts such as 115 and 116 may be recessed so as to form sockets of a female connector. In some embodiments, to prevent pooling of dust or moisture, electrical contacts such as 115 and 116 may be coplanar with a surface of connector 110, or may be raised above the connector surface to form a metal bump. A sealed, watertight boundary may be formed between the electrical contacts and the rest of connector 110.

In some embodiments, connector 110 may have guide cavities 112 and 114 that may form a fit with respective guide pins 212 and 214 of the docking station. Each pair of cavity and pin may have complementary shapes to form a snug fit. Either or both of the pin and cavity may be formed from a material, such as rubber, that may increase friction between the cavity surface and the pin surface when compared to, e.g., plastic surfaces. In some embodiments, connector 110 may have more (e.g., 4) or fewer (e.g., 1) guide cavities. In some embodiments, connector 110 may have no guide cavities, and may rely on another mechanism to guide two connectors as they engage each other. For example, one of the connectors may be shaped to form a slot, while the other connector may fit entirely and snugly within the slot. The complementary shapes of the two connectors may thus guide them as they engage each other.

Although docking connector 110 has electrical contacts that allows tablet 100 to communicate data and transfer power via a docking station's docking connector, the robustness of a data communication may be affected by an environment in which the tablet and docking station are used. When tablet 100 is docked with a vehicle-mounted docking station, for example, vibrations and shocks from the vehicle's movement may be transferred to the connectors of the tablet and docking station. As physical contact between the two connectors (or between individual contacts of the two connectors) may be diminished or may momentarily break due to the movement, the electrical connections between the two connectors may also be diminished or may momentarily break. A transferred analog signal may thus be distorted, while bits of a digital signal may be lost. Further, as the electrical contacts are exposed to moisture, extreme temperatures, dust and other conditions of a vehicular, outdoor, or other environment, they may corrode or deform. Movable contacts in these conditions may become immovable. These environmental factors may thus further diminish the quality of data transfer between docking connectors. A high number of electrical contacts or a high data transfer rate may increase the chance that data will be lost. A rugged environment may thus affect the quality of a data transfer that relies on physical electrical connections.

Power transfer, on the other hand, may be much less affected by such an environment because any momentary losses in contact between the two connectors are generally short and thus do not substantially affect the amount and rate of power transfer. Thus, a docking station's docking connector may rely on a physical electrical connection to transfer power, but may rely on an alternative manner of data transfer.

For example, some embodiments of interface connector 210 may include one or more electrical contacts for transferring power. Each of the contacts may be electrically connected to a power source or to ground. Each of the contacts may be adapted to transfer DC power to connector 110, or may be adapted to transfer AC power, which may then be transformed and/or rectified by tablet 100. The location of the one or more contacts may be determined by a predefined pin layout, such as the pin layout for connector 110. For example, electrical contact 216 may be located at a position that would electrically connect to corresponding power contact 116 when connectors 210 and 110 are engaged. The one or more electrical contacts on the docking station connector may formed as metal pins. In some embodiments, they may be spring-loaded pins, such as pogo pins.

While one or more pins, such as pin 216, may transfer power from docking station 200 to tablet 100, wireless communication device 230 of the docking station and wireless communication device 130 of the tablet may transfer data. Wireless communication is less affected by vibrations and shocks in a vehicle or any other rugged environment. Thus, both a robust data transfer and power transfer may be achieved. As discussed above, wireless communication device 230 may communicate data directly to or from a peripheral device connected to docking station 200, or may communicate the data to docking connector 210, which may relay the data to the peripheral device. The peripheral device may be connected through an electronic interface connector. In some embodiments, the docking connector 210 and wireless communication device 230 may be housed within the same housing.

As discussed above, in some embodiments in which docking connector 210 may have power contacts mounted on its surface, the power contacts may still be arranged according to a pin layout such as that for docking connector 110, which may include both power contacts and data contacts. Docking connector 210 may have few or no data contacts, however, because docking station 200 may now rely on wireless communication device 230 to communicate data. Thus docking connector 210 may be manufactured at a lower cost and complexity while still following the pin layout of docking connector 110 so as to be compatible with connector 110. For example, connector 210 may still arrange power pins according to the pin layout of connector 110, and may still have a shape that cooperates with the shape of connector 110 so as to be able to engage with connector 110 and so that its one or more power pins (e.g., 216) may correspond to and transfer power to power contacts (e.g., 116) on connector 110. A connector 110 made according to the pin layout thus may not need to be physically modified to interface with connector 210.

A software or firmware modification may be made in a computing circuit or computer-readable medium of tablet 100 to direct it to communicate data via wireless communication device 130 rather than connector 110. For example, one or more instructions distributed with an operating system upgrade may be loaded onto a computer-readable medium that may direct one or more processors of the tablet to detect whether an engaged docking connector of a docking station has a corresponding data pin. If there is no corresponding data pin, data associated with that pin may be transferred via wireless communication device 130. In some embodiments, the one or more instructions may direct data to be transferred via wireless communication device 130 without detecting whether the docking station's connector has corresponding data pins In some embodiments, docking connector 210 may include one or more pins that communicate data related to power transfer. Transferring such data directly through a data pin may be more efficient than through wireless modules 130 and 230. For example, module 130 may communicate the data with tablet 100 via, e.g., a USB interface, which may be less efficient than direct communication through the data pin. Thus, for example, docking connector 210 may mount a data pin that may receive requests for battery charging power from the docking station and may receive signals indicating that the battery has been fully charged. The data pins may be electrically connected to a power transfer controller of the docking station.

In some embodiments, docking connector 210 may mount a data pin for communicating hardware interrupts or direct memory access requests if wireless communication device 130 is unable to perform such interrupts or to make such requests. In these embodiments, the data transfer rate between a data contact on connector 110 and the data pin may be set sufficiently low to reduce the risk of data loss from vibrations and shocks.

Figure 4:
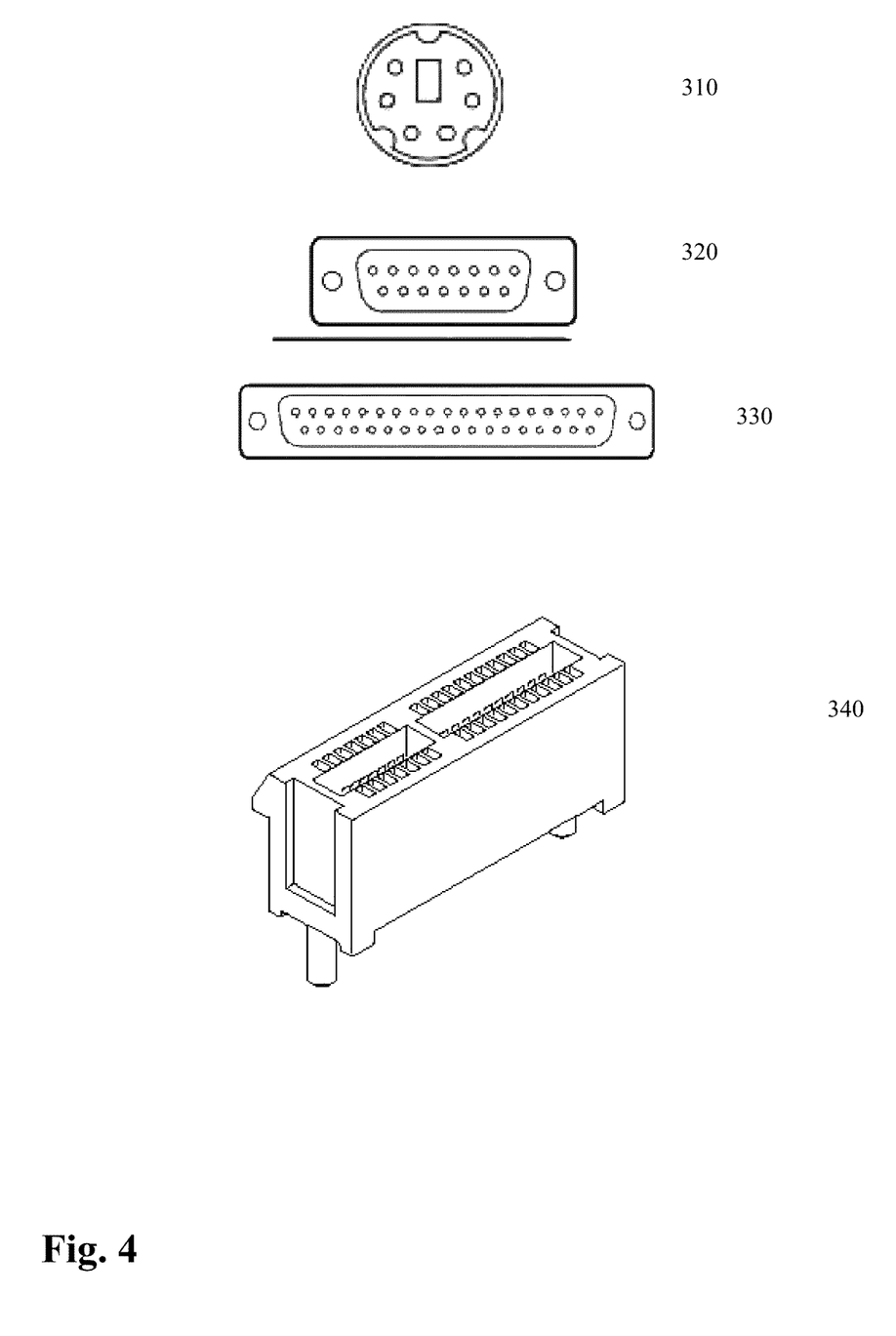
FIG. 4 illustrates example pin layouts and connector shapes with which a docking station's docking connector may be adapted to cooperate.

FIG. 4 illustrates alternative pin layouts and connector shapes of tablet docking connectors. For example, electrical contacts of a tablet docking connector may be shaped according to a DIN layout 310, a DIN layout 320, a DIN layout 330, a PCI-express layout 340, or any other pin layout. A docking station's docking connector may be shaped to cooperate with the shape of the tablet docking connector. For example, a docking station's docking connector may have a circular portion or a trapezoidal portion that is adapted to engage with a circular or trapezoidal portion, respectively, or the tablet docking connector. Power pins on the docking station's docking connector may be located according to one of pin layouts 310, 320, 330, 340, or any other pin layout used by the tablet docking connector. The docking station's docking connector may omit some or all of the data pins specified by the pin layouts, and thus may have less electrical contacts than on the tablet docking connector. The pin layouts shown herein are only examples, and any other pin layouts may be used.

Figure 5:
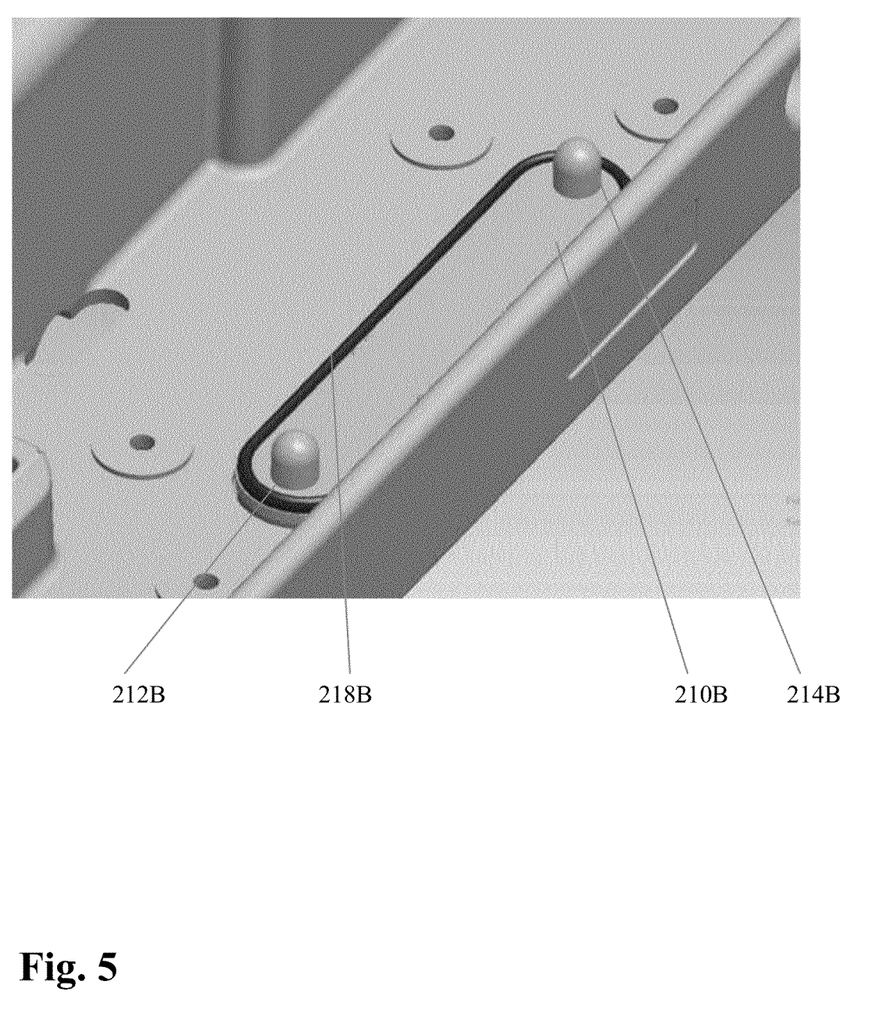
FIG. 5 illustrates an example docking connector of a docking station that is adapted to wirelessly transfer power to a ruggedized tablet.

FIG. 5 shows a docking connector 210B of the docking station in which power may be transferred wirelessly. Docking connector 210B may include a primary inductive coil adapted to inductively couple with a secondary coil, guide pins 212B and 214B, seal 218B, and a surface with few or no electrical contacts. The primary inductive coil may be housed within a housing of docking connector 212B. The connector's housing may be watertight, which reduces the effect of moisture and corrosion on the power transfer. The inductive coil may have one or more turns and may be axially aligned with a top surface of docking connector 210B such that it emits magnetic field lines that are perpendicular to the top surface. Magnetic permeable shielding, such as a ferrite plate and/or a copper sheet, may be located under the primary inductive coil so as to isolate the electromagnetic field generated by the coil from other electronic components of docking station 210B.

In such embodiments, tablet 100 may have a docking connector that includes a secondary coil adapted to receive power from the primary coil. Tablet 100 may further include circuitry adapted to transform and/or rectify power received by the tablet's inductive coil. The primary coil and secondary coil may be located so that they are substantially coaxially aligned when the connectors' guide pins and guide recesses are engaged. In such embodiments, the guide pins and guide recesses may be sized so as to minimize the distance between the inductive coils while still maintaining sufficient friction between the two connectors to keep them engaged. The two inductive coils may have substantially the same size, or may have different sizes. In some embodiments, the two coils may have dimensions that yield the same electric resonance frequency or frequencies. In some embodiments, magnetic permeable shielding may be located above the secondary coil so as to isolate the electromagnetic fields generated by the primary coil from electronic components of the tablet. In some of these embodiments, the docking connector of tablet 100 may still have power and data electrical contacts mounted on its surface, or may have no electrical contacts on its surface. In some of these embodiments, the docking connector may be in a standby mode until presence of the tablet is detected. Presence of the tablet may be detected through a wireless data signal, a detected resonance change, a contact switch on one or both of the docking connectors, or any other proximity detection device.

Figure 6:
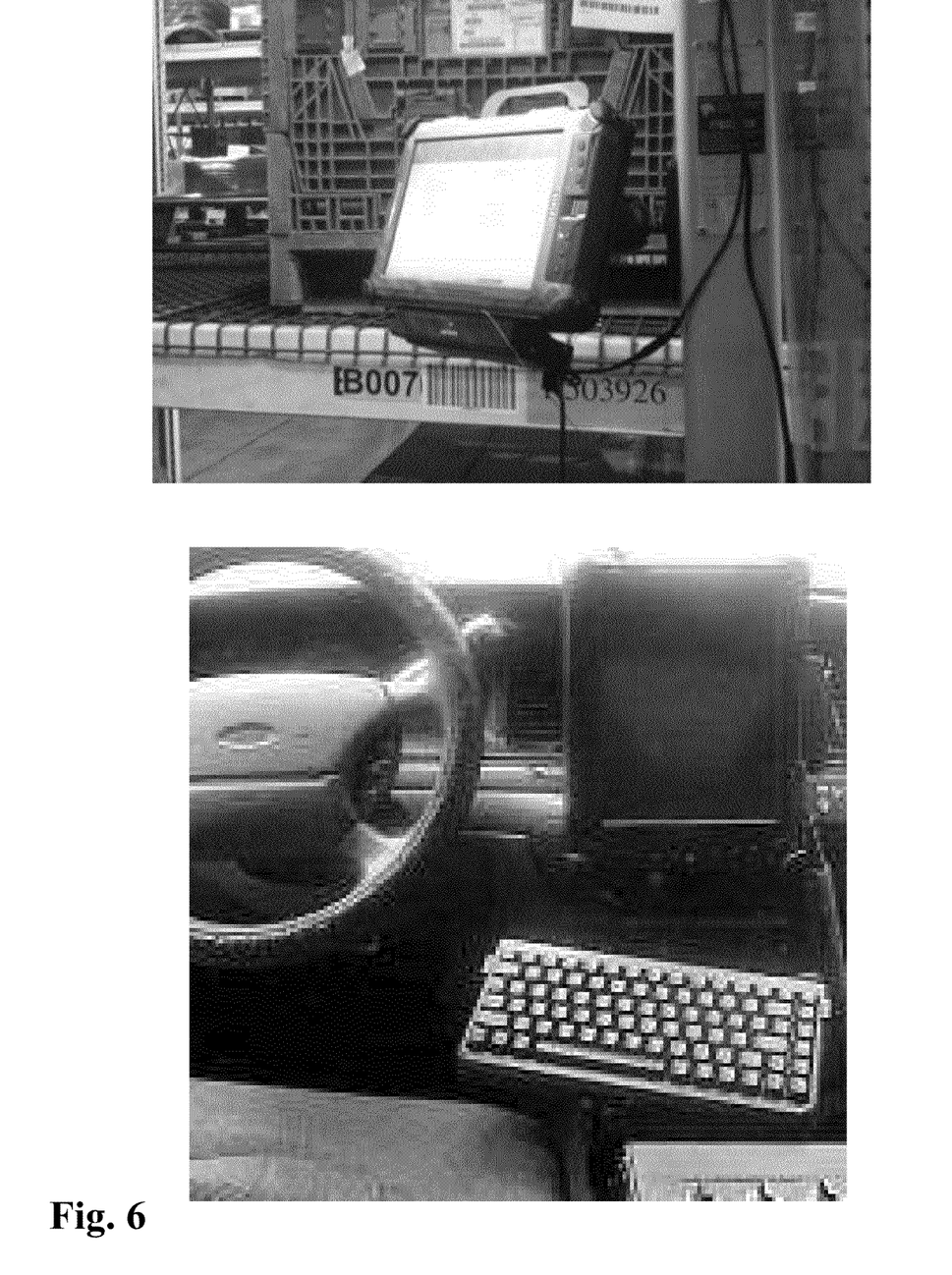
FIG. 6 illustrates example computer docking systems mounted to vehicles.
Figure 7:
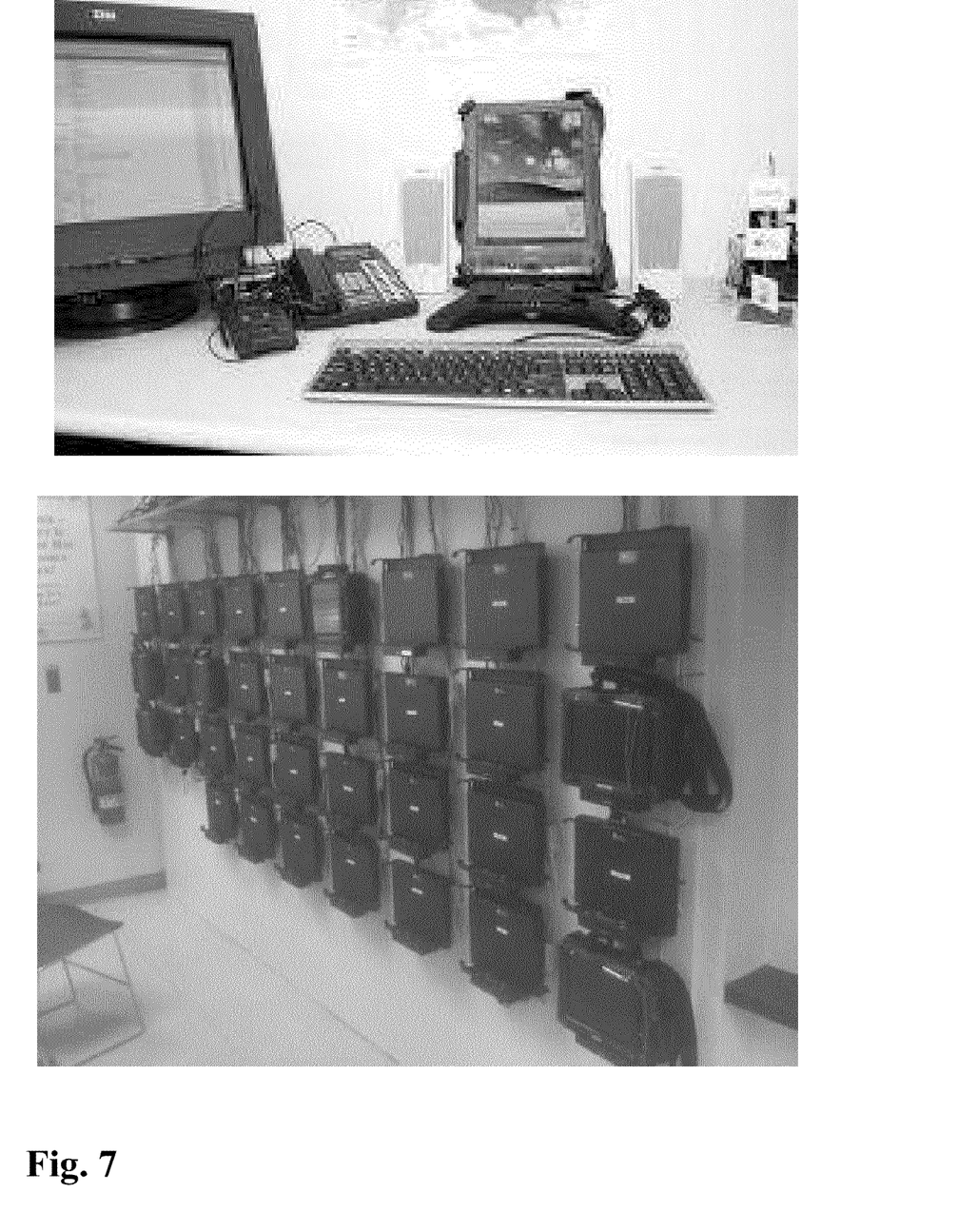
FIG. 7 illustrates example computer docking systems.

FIGS. 6 and 7 illustrate example applications of docking system 10. For example, docking station 200 may be used in a mobile environment such as a vehicle (e.g., a forklift, a car, a bus, a truck). Docking station 200 may comprise a VESA-compliant mounting interface. For example, the docking station housing may form mount bolt holes in a VESA-standard pattern. The housing may then be attached to VESA-compliant pole mounts. In another example, docking station 200 may be used in a stationary environment, such as in a desktop setting or on a wall mount.

As used herein, the term data and related phrases may refer to data in analog form or digital form. As discussed above, data may refer to both information and to instructions or commands.

Although particular types of connectors and layouts are disclosed herein, any connector and/or layout may be replaced with any other suitable connector or layout without deviating from the scope of the present invention. A variety of additional features, components, and/or structures may be added to the docking system 10 without deviating from the scope of the present invention.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A docking station for data and power transfer with a portable computing device, the docking station comprising:
   a housing forming a cradle assembly adapted to receive the portable computing device;
   a first docking connector coupled to the cradle assembly of the housing, the first docking connector having one or more power pins, one or more data pins, and one or more guide pins mounted on a surface of the first docking connector;
   a wireless communication device adapted to communicate data with the portable computing device;
   and a power transfer controller adapted to supply battery charging power to the portable computing device,
   wherein the one or more power pins, one or more data pins, and one or more guide pins are the only pins on the surface of the first docking connector and wherein each of the one or more power pins are electrically connected to a DC power source,
   wherein each of the one or more guide pins are adapted to fit into a guide recess on the surface of the second docking connector to frictionally couple the first docking connector and the second docking connector when the two docking connectors are physically engaged,
   wherein each of the one or more data pins are electrically connected to the power transfer controller, and wherein the power transfer controller is adapted to control a data transfer rate for communicating data with the portable computing device,
   wherein the surface of the first docking connector has a shape configured to cooperate with a shape of a surface of a second docking connector of the portable computing device, the second docking connector having one or more power electrical contacts and one or more data electrical contacts,
   wherein each of the one or more power pins on the surface of the first docking connector is located so as to contact one of the one or more power electrical contacts when the first docking connector physically engages the second docking connector,
   wherein each of the one or more data pins on the surface of the first docking connector is located so as to contact one of the one or more data electrical contacts when the first docking connector physically engages the second docking connector, and
   wherein the total number of electrical contacts on the second docking connector is more than the total number of electrically conductive pins on the first docking connector.

2. The docking station of claim 1, wherein the first docking connector comprises a seal that encloses a perimeter of the first docking connector and that is adapted to form a water-tight seal when the first docking connector physically engages the second docking connector.

3. The docking station of claim 1, wherein the one or more power pins and the one or more data pins of the first docking connector comprises one or more spring-loaded pins.

4. The docking station of claim 1, wherein the first docking connector is detachably coupled to the cradle assembly of the docking station housing.

5. The docking station of claim 1, wherein the housing of the docking station forms a water-tight compartment, and wherein the wireless communication device is housed in the water-tight compartment.

* * * * *